Nov. 9, 1954  W. G. BRETSON ET AL  2,693,918
PLASTIC TAPE CORE
Filed March 17, 1950
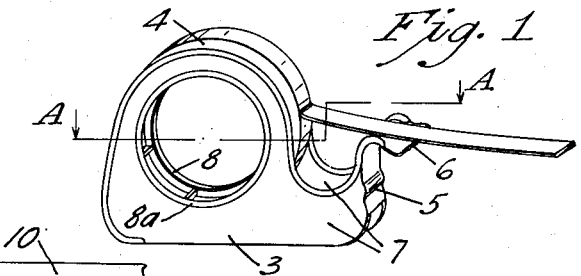
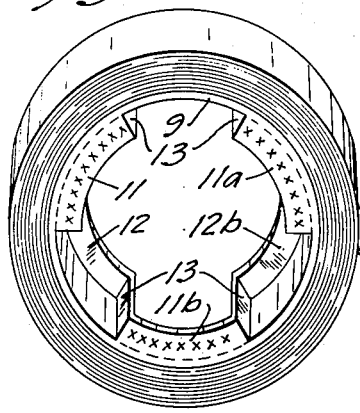
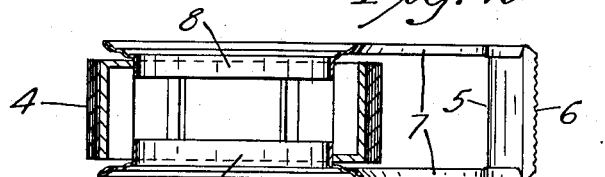
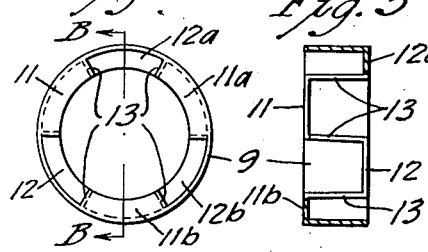
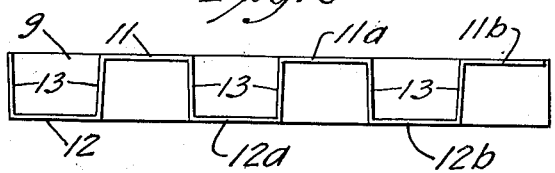
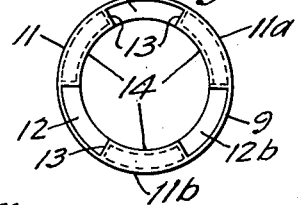
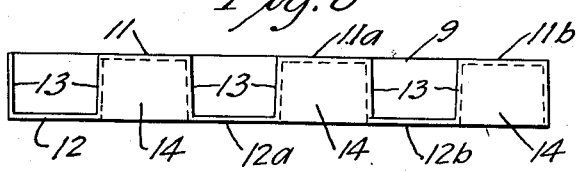
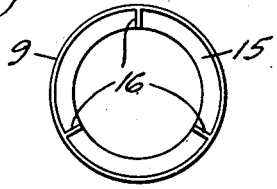
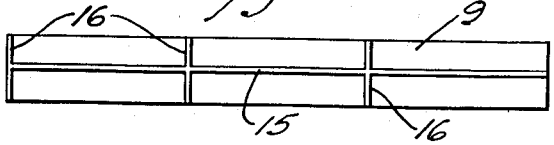
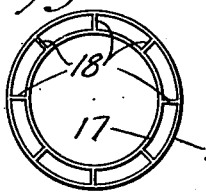
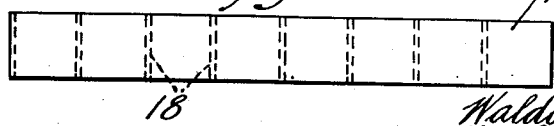
Inventors
Waldo G. Bretson
Harold B. Wistrand
By Carpenter, Abbott, Coulter & Kinney
Attorneys

United States Patent Office 2,693,918
Patented Nov. 9, 1954

2,693,918

PLASTIC TAPE CORE

Waldo G. Bretson, Minneapolis, and Harold B. Wistrand, Excelsior, Minn., assignors to Minnesota Mining & Manufacturing Company, St. Paul, Minn., a corporation of Delaware Application March 17, 1950, Serial No. 150,296

4 Claims. (Cl. 242—55.5)

This invention relates to the art of winding, holding and dispensing tapes, and to improved rolls of tape, and provides for a novel plastic tape core. The invention finds particular utility in respect to pressure-sensitive adhesive tapes such as the kinds, for example, that are disclosed in United States Patents Numbers 1,760,820 and 2,177,627 issued to Richard G. Drew. However, the invention also has great utility in respect to ordinary gummed tape and to ribbon material.

Adhesive tapes, including pressure-sensitive adhesive tapes, are ordinarily sold in roll form. Previous to this invention, the tape rolls were wound upon cardboard cores. In the case of pressure-sensitive adhesive tape, an item widely distributed is a so-called "short roll" of tape; 100, 200, 300 or 400 inches in length and of varying width. These "short rolls" of tape are mounted in a stamped sheet metal holding and dispensing device, and the combined roll of tape and dispensing device are sold as a unit. The holding function of the dispensing device is performed by tubular core supporting flanges struck inwardly from opposed parallel side walls, which walls are spaced according to the width of the tape and core to be held therebetween. These inwardly projecting roll supports are adapted to fit within the tape core and hold the roll in the dispenser.

There were numerous defects in these rolls of tape and in this tape and dispenser unit, because of the practice, as above stated, of winding the tape upon a cardboard core. First, because of the fact that the machinery used in the paper industry to manufacture and slit these cores was not designed to hold sufficiently close tolerances, there was commonly considerable irregularity in size, either in diameter or width, among the cardboard cores upon which the tape was wound. A difference in width made difficult and unsatisfactory the holding and dispensing of the tape for the reason that the dispenser was designed only for a particular width of tape and a roll of improper size would not fit snugly on the supporting shoulders of the dispenser. Similarly, differences in size which commonly occurred in the inside diameter of the tape core likewise prevented a proper fit between the cardboard core and the metal dispenser. Furthermore, because of the relatively soft surface of cardboard cores, it was necessary to exercise a great deal of care in mounting a tape-wound core in a stamped sheet metal dispenser, for if the core were not centered just properly to fit over the supporting shoulders of the dispenser, the sharp inwardly facing edges of those shoulders would pinch the core so that it would not rotate properly in the dispenser. In such case it was necessary to remount the core by hand, an expensive and time-consuming procedure. It was also necessary to set up an inspection system whereby such defective units would be detected. It is an object of this invention to provide a hard-surfaced core which will slide into registry even though originally inserted slightly off center.

In addition to the particular problems above, the irregularity in size among cardboard cores created a number of problems in the manufacture of the tape rolls. For instance, when a number of cardboard cores on a common spindle were being wound with tape, those with the larger diameter were often wound with excessive tension, which was likely to result in "telescoping" of the tape roll (as hereinafter discussed), whereas the smaller rolls were not wound tightly enough, causing gaps between successive layers of tape which affected the appearance and utility of the product.

A further well-known disadvantage in cardboard cores, especially objectionable when pressure-sensitive adhesive tape is being wound thereon, was "core dust." When paper cores are slit to the width desired for winding a strip of tape thereon, there is left on the individual core a considerable amount of "dust." This "dust" is made up in large part of filler used in manufacturing the cores. During the winding operation this dust becomes transferred to the normally tacky adhesive surface of the pressure-sensitive adhesive tape, thereby interfering with its adhesive function, and in the case of transparent tape, also impairing the appearance and transparency thereof. Such dust is also highly abrasive and causes considerable damage to the machinery used in slitting and winding the tape rolls.

A further disadvantage in the use of paper cores was that the initial wrap of tape around the core was not usable. This initial wrap adhered to the surface of the core and when unwound therefrom carried with it the outer layer of the paper core, the tape then being useless for any adhesive purpose. This resulted in the waste of a very considerable amount of tape. For instance, the circumference of a "short roll" core is approximately 4.25 inches, and many hundreds of thousands of such rolls are sold annually. With the smooth non-delaminable surface of our plastic core, the initial wrap of tape can be unrolled without damage and is fully usable by the purchaser.

A still further disadvantage in the use of paper cores was that they were not consistently round in shape, either because they were not so manufactured or because they were distorted during handling or processing. Tape could not be wound satisfactorily upon a core not round in shape, or if it became distorted after being wound with tape, it could not be used satisfactorily in the dispenser for which it was intended, which required a round shaped core.

A further objection to the use of cardboard cores is that they are not dimensionally stable when subjected to variations in temperature and humidity. Most serious is the effect of high atmospheric humidity to which these cores may be subjected in certain areas of use. Moisture is absorbed by the core which causes swelling, resulting in the building up of considerable radial compression or squeezing of the tape wound thereon. "Telescoping" (that is, lateral displacement of the turns of the roll toward one side) may result when it is sought to relieve the pressure. As telescoping causes an increase in the total roll width, the result is that a badly telescoped roll cannot be inserted in a dispenser designed for a particular width.

Another objection to the use of paper cores was their high proportionate cost for an item having a low sale price. This expense per salable unit was substantially increased by the necessity of rejecting cores which did not meet the very rigid size specifications which were maintained for the reasons indicated hereinabove.

Notwithstanding these very numerous and well-known objections to the use of paper cores, and despite the fact that plastic molding is a highly developed art, it was never previously known that it was either mechanically or economically possible to use a plastic for tape cores although it was recognized that plastic material would entirely overcome or greatly minimize the disadvantages inherent in the use of paper cores.

There were many reasons for the failure of the prior art to develop a plastic tape core. For instance, paper cores were customarily made at least .175 inch thick so that said cores would retain their round shape while being processed and handled. This core thickness was equivalent to a difference of .35 inch difference between the inside and outside diameter of such cores. All existing equipment was adapted to work with rolls having a core of such size, and dispensers which could be stamped out by existing equipment would accommodate only a roll of tape wound on a core having such a difference between inside and outside diameter. Never previous to this invention was it thought to be economically possible to produce a plastic tape core having such a difference in inside and outside diameter. It was heretofore believed that the cost of the plastic necessary to do this would make the cost of the core too high in respect to the cost of the unit.

The principal objects and advantages of this invention reside in the provision of a novel plastic tape core, having sufficient strength to withstand the strains of processing and use, which strength is obtained through core design rather than by the quantity of plastic used. A further object and advantage of this invention resides in the provision of a tape core that is of such construction that it can be molded efficiently at high speeds, holding very close size tolerances with little breakage and little mold trouble, that is made of material that is relatively inexpensive, dimensionally stable and attractive to the eye; which has acceptable physical properties, is normally round in shape and is constructed of material which will return to that shape when temporarily distorted out of it; and which has space thereon for the clearly visible application of trade-mark and patent information or other indicia. A further advantage of this invention resides in the provision of a tape core having a smooth outer circumference from which the initial wrap of tape will unwind without delamination of the tape or the core and will be fully usable for its intended purposes.

Other objects and advantages will be apparent from the following description of one practical embodiment of the invention as shown in the accompanying drawing of which Figure 1 is a perspective view of the tape core, with tape wound thereon, mounted in a "short roll" dispenser;

Figure 2 is a horizontal section taken along line A—A of Figure 1 and illustrates the manner in which the core is held within the dispenser;

Figure 3 is a perspective view of the preferred embodiment of the tape core with tape wound thereon;

Figure 4 is a side elevational view of the core shown in Figure 3;

Figure 5 is a cross-sectional view of the core of Figure 4, along the line B—B of Figure 4;

Figure 6 is an expanded plan view of the inner circumference of the core of Figure 4, showing the construction of the reinforcing framework of the core;

Figures 7, 9 and 11 are side elevational views of alternative embodiments of the core;

Figures 8, 10 and 12 are expanded plan views of the inner circumference of the alternative forms of core shown in Figures 7, 9 and 11 respectively.

Referring in detail to the drawings, Figure 1 shows the plastic tape core of this invention, with tape wound thereon, mounted in a holding and dispensing device for said tape roll. The dispensing device is indicated generally by the reference character 3 and the tape-wound core by the reference character 4. The dispensing device 3, in which our tape-wound plastic core is inserted, comprises a front wall 5, bearing a cutting edge 6 and a spaced parallel side walls 7, extending from said front wall 5. The width of the front wall 5 and the consequent space between the side walls 7 which extend therefrom, will depend upon the width of tape which is to be dispensed.

As shown more clearly in Figure 2, tubular core supporting flanges 8 and 8a are struck inwardly from the side walls 7. The tape-wound core is mounted upon said flanges, which are of a diameter to fit snugly within the tape core hereinafter described.

Referring now to Figures 3–6, which are various views of the core without the dispenser, the reference character 9 indicates a thin annular shell upon and in contact with which a strip of pressure-sensitive tape 10 or other strip material is wound. Extending inwardly from said shell, and joined thereto, are three face plates 11, 11a and 11b, each of which extends along one lip of the inner circumference of the shell 9 for a distance of slightly less than 60° thereof. As is indicated by the series of X's on said face plates in Figure 3, they are suitable for bearing indicia, such as the tape manufacturer's name, address or patent or trade-mark information. Extending inwardly from the opposite lip of the inner circumference of the shell 9 are three similar face plates 12, 12a, and 12b which are positioned in staggered relation to face plates 11, 11a and 11b. Extending transversely of the inner circumference of shell 9, and affixed thereto, are supporting ribs 13, each of which terminates at, and is joined to the end portion of a face plate on each lip of shell 9. The face plates extend inwardly from the shell 9 a distance sufficient so that the discontinuous circle formed by their inwardly facing arcuate edges will be of a diameter equal to or very slightly greater than the diameter of the core supporting flanges 8 and 8a. The tape-wound core 4 will thus be held securely within the dispenser 3. The ribs 13 serve to support the face plates, and prevent them from breaking off when the core is being wound with tape, or inserted in the dispenser, or when the tape and dispenser unit is in use. It should be understood that this invention contemplates the use of a greater or lesser number of face plates and transverse ribs. For example, four, five, six or more face plates could be affixed to each lip of the shell with the proper number of transverse ribs connecting and giving support to them. On the other hand, only two face plates could be joined to each lip with only four transverse ribs supporting them. However, a larger number of face plates and ribs requires more plastic material to mold the core, and the additional plates do not aid materially in the use of the tape and dispenser unit. If fewer than three face plates are used, the core is not held sufficiently securely within the dispenser. Therefore, the preferred embodiment of our core has three equidistantly spaced face plates on each lip of the core and six transverse ribs supporting them, as shown. In the preferred construction shown, only about one-third of the total amount of plastic material in the core is in the face plates and transverse ribs. Thus this construction gets its strength through design rather than through the quantity of plastic used.

In the preferred core as shown in Figure 3 hereof, the transverse supporting ribs 13 are of height equal to the face plates; that is, they extend equally far inwardly from the shell 9. This construction is preferred so that there will be a margin of safety against the cracking or breaking off of the face plates. However, a slightly smaller amount of plastic material would be necessary to mold the core if the height of the transverse ribs 13 were somewhat less than that of the face plates, and this invention contemplates such construction where the margin of safety mentioned above is not required.

In addition to their function of holding the core within the dispenser, the face plates 11—11b and 12—12b, also serve to keep the core round in shape. As pointed out hereinabove, this is important, both in the winding of the tape upon the core and in the dispensing of the tape after the core is mounted in the dispenser. In the core of this invention, the curve of the outwardly facing edge of each face plate corresponds to the desired degree of curve of the shell 9, and, by reason of said face plates being integrally joined to said shell, the round shape of the shell is maintained. Each of the six face plates serves to maintain the arc of the particular segment of shell 9 to which it is affixed.

Referring now particularly to Figures 5 and 6; face plates 11, 11a and 11b and 12, 12a and 12b, extend along the lips of shell 9 for a distance slightly less than 60° of the circumference thereof, and supporting ribs 13 extend transversely of the circumference at a slight angle to the axis of the core. This construction is preferred to facilitate withdrawal of the core from the molding apparatus. However said face plates may extend a full 60° along the lips of the shell with only a slight lessening of efficiency in molding, and such construction is contemplated herein. In such construction the ribs 13 will extend parallel to the core axis.

Figures 7 and 8 illustrate an alternative form of core, which differs from the preferred embodiment previously shown and described by the inclusion of further supporting elements 14, which comprise arcuately shaped segments joined to the inwardly facing edges of face plates 11, 11a and 11b and extending transversely of shell 9, concentric thereto. Said segments 14 serve to provide further support and reinforcement for the core.

Figures 9 and 10 illustrate a second alternative core comprising an annular shell 9, a flat, ring-shaped supporting element 15 integrally joined to the inner circumference of said shell 9, and transverse ribs 16 adapted to support element 15, and themselves to be supported thereby. It will be apparent that a fewer or greater number of supporting ribs 16 could be used and that supporting element 15 could be located at one or the other lips of shell 9 or at any place intermediate thereof.

Figures 11 and 12 illustrate an alternative core comprising an outer annular shell 9, and a concentric inner annular shell 17 spaced apart from shell 9 and supported by ribs 18. This construction may be modified to substitute face plates (such as are indicated by reference characters 11—11b and 12—12b in Figure 6, for instance) for ribs 18, or, both ribs and face plates may be used to support the inner annular shell.

It is preferred to mold the tape core of this invention from polystyrene molding powder. This material forms a core which is dimensionally stable although subjected to variations in temperature and humidity, which is inexpensive, and which is pleasing to the eye, producing a core which is substantially transparent if no pigment has been added to the molding powder, or, if it is desired to have a colored core (for instance, in order to complement the color of tape wound thereon), this can be done very easily by adding the proper pigment to the polystyrene. Among the plastic molding materials now generally available, we have found that polystyrene offers the best combination of inexpensiveness and desirable physical characteristics. It is to be understood, however, that the use of other plastic materials comes within the scope of this invention.

Further important advantages and savings which we have found to result by reason of this invention are the following: First, the weight of the plastic core is only about one-third that of the paper cores previously used. Therefore the cost of shipping the cores from the place of their manufacture to the place where they are wound with tape is very much less. Also the cost of shipping tape-wound cores or core and dispenser units is greatly reduced; second, because of the ease of plastic production control, inventories of completed cores can be kept at a minimum, thus reducing the amount of storage space required. Furthermore, it requires only a small amount of space to store polystyrene powder preparatory to molding plastic cores, whereas it requires a relatively large amount of storage space in which to keep paper tubes preparatory to slitting them down to core size. Third, no special precautions need be taken in storing polystyrene powder or cores molded therefrom because polystyrene is unaffected by normal temperature changes or moisture. As pointed out hereinabove, this is not the case with paper cores.

What we claim is:

1. A plastic core for convolutely wound strip material comprising a thin annular shell and an inner supporting framework for said shell integral therewith, substantially less plastic material being used in the framework than in the shell, said framework comprising face plates extending inwardly from each edge of the shell and face plate supporting ribs extending transversely of the shell and each joined at each end to a face plate on an opposite lip of the shell, the innermost edge of each of said face plates being curved concentrically with the curve of said shell, to provide said core with a plurality of inwardly facing, spaced, curved bearing surfaces, whereby said core may be rotatably mounted in a dispensing machine.

2. An assembly comprising a core and a roll of transparent pressure-sensitive tape wound thereon, said core being made of a clear transparent resin or plastic, said core comprising a thin annular shell having a smooth outer circumferential plastic surface, on and in contact with which said tape is wound, and said core having supporting ribs of substantially greater depth than the thickness of said shell and integrally joined to the inner circumference thereof, the innermost edges of a plurality of said ribs being curved concentrically with the curve of said shell, to provide said core with a plurality of inwardly facing, spaced, curved bearing surfaces, whereby said assembly may be rotatably mounted in a dispensing machine, said core and roll assembly being free or substantially free of any opaque element and being of a clear, translucent nature.

3. An assembly comprising a core and a roll of colored pressure-sensitive tape wound thereon, said core being made of resin or plastic and being pigmented to complement the color of the tape wound thereon, said core comprising a thin annular shell around and in contact with which said strip material is wound, and a reinforcing framework integral with and extending around the inner circumference of said shell, said framework comprising spaced segmental face plates suitable for bearing indicia extending along and inwardly from each edge of the inner circumference of the shell, and supporting ribs extending transversely of the inner circumference of the shell and terminating at and integrally joined to the inner faces of face plates on opposite edges of the shell, the innermost edges of said face plates being curved concentrically with the curve of said shell, to provide said core with a plurality of inwardly facing, curved, spaced, bearing surfaces, whereby said assembly may be rotatably mounted in a dispensing machine.

4. A plastic core for a strip of convolutely wound material, comprising a thin annular shell around and in contact with which said strip material is wound, and a reinforcing framework integral with and extending around the inner circumference of said shell, said framework comprising spaced segmental face plates extending along each edge of said shell and inwardly therefrom, supporting ribs extending transversely of the shell, each of said ribs being joined to a face plate on each edge of the shell, the innermost edge of each of said face plates being curved concentrically with the curve of said shell, to provide said core with a plurality of inwardly facing, spaced, curved bearing surfaces, whereby said core may be rotatably mounted in a dispensing machine.

References Cited in the file of this patent

UNITED STATES PATENTS

| Number | Name | Date |
|---|---|---|
| Re. 13,822 | Livingston | Nov. 3, 1914 |
| 1,962,959 | Kinloch | June 12, 1934 |
| 2,112,209 | Goldsmith | Mar. 22, 1938 |
| 2,350,369 | Sampair et al. | June 6, 1944 |

FOREIGN PATENTS

| Number | Country | Date |
|---|---|---|
| 754,968 | France | Sept. 4, 1933 |